United States Patent Office 3,578,724
Patented May 11, 1971

3,578,724
MIGRATION AND ISOMERIZATION OF ACETYLENES
Andre Jules Hubert, Brussels, Belgium, assignor to Union Carbide Corporation
No Drawing. Filed Mar. 4, 1968, Ser. No. 709,942
Int. Cl. C07c 5/22, 11/12, 11/22
U.S. Cl. 260—678
4 Claims

ABSTRACT OF THE DISCLOSURE

Process for the migration of acetylenic bonds and a process for the isomerization of hydrocarbons containing acetylenic bonds to hydrocarbons containing conjugated unsaturation, by contacting a compound containing one or two acetylenic bonds with potassium amide on alumina. The unsaturated compounds produced by the process of the invention are useful as ultraviolet light absorbers, as cross-linking agents for polyolefinic elastomers, and as intermediates in the synthesis of new compounds.

The invention relates to a process for the isomerization of unsaturated hydrocarbons by contacting said unsaturated hydrocarbons with potassium amide on alumina. In one aspect, the invention relates to the isomerization or the migration of terminal or alpha-acetylenes. In another aspect, the invention relates to the isomerization of compounds having two acetylenic bonds to hydrocarbons containing conjugated unsaturation.

In its first aspect, the invention relates to the migration of acetylenic bonds such as the isomerization of terminal or alpha-acetylenes to beta-acetylenes. The migration is carried out by contacting an acetylene with potassium amide on alumina. The overall reaction can be represented in simplification by the following equation:

(a) $HC \equiv CCH_2R \xrightarrow[\text{Alumina}]{\text{KNH}_2 \text{ on}} H_3C-C \equiv CR$ wherein R represents alkyl, alkenyl, or alkynyl of up to 22 carbon atoms, and preferably, of up to 16 carbon atoms.

The catalyst employed in the process of this invention is a dispersion of potassium amide on alumina, which can be prepared by known methods. For instance, potassium amide dispersion on alumina can be prepared by adding potassium metal to a suspension of alumina powder in an excess of liquid ammonia and then evaporating the excess ammonia after the reaction of the potassium and ammonia is complete. The rate of reaction of potassium with ammonia can be increased by adding small quantities of ferric nitrate as a catalyst. The preparation of the catalyst is preferably carried out under an inert atmosphere such as nitrogen. The proportion of potassium amide to alumina in the catalyst can vary fairly widely, for example, from about 0.5 to about 10 weight percent of potassium amide on the alumina has been found to be useful. The percentage is based upon the weight of alumina.

The process of the first aspect of the invention is carried out by contacting an alpha-acetylene with the potassium amide on alumina catalyst. Among the alpha-acetylenes that can be used in the process of the invention are the following compounds:

1-butyne, 1-pentyne, 1-hexyne, 1-heptyne, 1-octyne, 1-nonyne, 1-decyne, 1-undecyne, 1-dodecyne, 1-tridecyne, 1-tetradecyne, 1-hexadecyne, 1-octadecyne, 1-eicosyne, pent-1-yn-4-ene, hex-1-yn-5-ene, 1,7-octadiyne, 1,8-nonadiyne, 1,9-decadiyne, 1,10-undecadiyne, 1,11-dodecadiyne, 1-13-tetradecadiyne, dec-1-yn-6-ene, and the like.

The preferred alpha-acetylenic compounds are the alpha, omega-alkadiynes, having at least eight carbon atoms.

The alpha-acetylenes constitute a known class of materials that can be prepared by reacting an alkali metal acetylide with a hydrocarbyl bromide. The following reaction is illustrative:

$CH_3CH_2CH_2Br + NaC \equiv CH \rightarrow CH_3(CH_2)_2C \equiv CH + NaBr$

The reaction can also be used to prepare alpha, omega-alkadiynes by using as the starting reactant an alpha, omega-dibromide which is then reacted with two equivalents of alkali metal acetylide.

The process of the first aspect of the invention can be carried out simply by mixing the alpha-acetylene in a conventional reaction vessel with the potassium amide on alumina catalyst for a period of time sufficient to rearrange the alpha-acetylene to a beta-acetylene. In most cases, it is convenient to employ an inert solvent in the reaction mixture. Such solvents include hexane, heptane, octane, benzene, cyclohexane, and other hydrocarbons. The inert solvent can constitute from about 5 to about 40 percent, by weight, of the reaction mixture. While higher concentrations of solvent can be employed, when the concentration of the solvent constitutes, for example, at least 60 or 70 weight percent of the reaction mixture, the further isomerization of the di(beta-acetylene) product to a conjugated tetraene begins to become significant. This is desirable in those cases where the desired ultimate product is a tetraene, but it is not desired in those cases wherein it is desired to isolate the di(beta-acetylene). The conditions for the further isomerization of di(beta-acetylenes) to tetraenes will be discussed more fully below. In this first aspect of the invention, the proportion of the catalyst, i.e., potassium amide plus alumina, can vary over a fairly wide range. For example, the catalyst can be employed in amounts of from about 5 to about 50 weight percent, based upon weight of catalyst plus alpha-acetylene. Higher proportions of catalyst begins to favor the further isomerization of the di(beta-acetylene) to a conjugated tetraene, as will be discussed more fully below.

The rearrangement reaction can be carried out at room temperature. Although temperatures above and below room temperature can be employed if desired, room temperature is preferred because it is most convenient. Thus, the reaction can be carried out at a temperature of from about 0° up to about 160° C., and the preferred temperature is from about 20° to about 30° C. The reaction is continued for a period of time sufficient to produce a beta-acetylene. This reaction is fairly rapid, and normally takes from about 1 to about 60 minutes.

The beta-acetylene can be recovered by standard procedures. For example, the catalyst can be filtered off and the beta-acetylene can be separated from unreacted starting material, if any, and solvent by fractional distillation. Conventional reaction equipment constructed of conventional materials can be employed for the process. Atmospheric pressures normally used for convenience, although the reaction is operative at superatmospheric and at subatmospheric pressures. In sme cases, superatmospheric pressure may be desired when the alpha-acetylene is a comparatively volatile compound.

The second aspect of the invention comprises contacting a hydrocarbon having two internal triple bonds with potassium amide on alumina to form a conjugated tetraene. The hydrocarbon having two internal triple bonds has at least eight carbon atoms and it can have up to, for example, twenty carbon atoms. The triple bonds must be sufficiently close together in the hydrocarbon chain so that they can interact to form a conjugated tetraene. To illustrate this principle, the following reactions have been observed to occur in accordance with the process of the invention:

(1) $CH_3-C\equiv C-(CH_2)_2-C\equiv C-CH_3 \rightarrow$
$CH_2=CH-CH=CH-CH=CH-CH=CH_2$ (2) $CH_3-C\equiv C-(CH_2)_3-C\equiv C-CH_3 \rightarrow$
$CH_2=CH-(CH=CH)_3-CH_3$ (3) $CH_3-C\equiv C-(CH_2)_4-C\equiv C-CH_3 \rightarrow$
$CH_3-(CH=CH)_4-CH_3$ (4) $CH_3-C\equiv C-(CH_2)_5-C\equiv C-CH_3 \rightarrow$
$CH_3-CH_2-(CH=CH)_4-CH_3$ (5) $CH_3-C\equiv C-(CH_2)_6-C\equiv C-CH_3 \rightarrow$
$CH_3-CH_2-(CH\equiv CH)_4-CH_2-CH_3$ (6) $CH_3CH_2CH_2C\equiv C-C\equiv C-CH_2CH_2CH_3 \rightarrow$
$CH_3-(CH=CH)_4-CH_3$ From a consideration of the foregoing reactions (1) through (8), some general rules can be formulated with respect to the process of the second aspect of the invention. First, the product of the reaction will contain a series of four conjugated double bonds. Second, the two triple bonds in the starting reactant can be separated by as many as six methylene groups.

The unsaturated compounds that are used as the starting reactants in this second aspect of the invention are hydrocarbons that contain two internal acetylenic bonds. The term "internal acetylenic bond" refers to a triple bond that is located anywhere in the hydrocarbon compounds except between two terminal carbon atoms, i.e., the 1 and 2 positions.

Among the hydrocarbons containing two internal acetylenic bonds that can be used in this second aspect of the invention are the following compounds:

2,6-octadiyne, 2,7-nonadiyne, 2,8-decadiyne, 5,7-dodecadiyne, 4,6-decadiyne, 2,9-undecadiyne, 2,10-dodecadiyne and the like.

The preferred compounds are the di-(beta-acetylenes) such as 2,7-nonadiyne and 2,9-undecadiyne, that are produced as products of the preferred part of the first aspect of the invention.

Compounds containing internal acetylenic bonds constitute a known class of compounds that can be prepared by several different methods. For instance, beta-acetylenes can be prepared by the rearrangement process that comprises the first aspect of the invention.

The process of the second aspect of the invention is carried out simply by contacting the catalyst with a hydrocarbon having one or more internal acetylenic bonds. If desired, an inert solvent can be used for the reaction. Such solvents include pentane, hexane, heptane, octane, decane, isooctane, petroleum ether, benzene and the like. In general, when the second aspect of the invention is being carried out, a relatively dilute solution of the starting reactant is preferred. Therefore, the inert solvent can constitute from 50 percent up to for example 90 weight percent of the reaction mixture.

The proportion of catalyst in the second aspect of the invention is generally rather high. For example, the catalyst, i.e., potassium amide plus alumina, can constitute from about 50 up to about 90 weight percent of the weight of the starting reactant plus catalyst.

The reaction is carried out for a period of time sufficient to product a compound containing four conjugated ethylenic double bonds. In general, the reaction time will be from about ½ to about 24 hours. The reaction temperature can vary fairly widely, for example, from about 0° to about 160° C., and more preferably from about 20° to about 30° C. Atmospheric pressure is normally employed, although superatomspheric and subatmospheric pressure can be employed for the reaction if desired. Conventional reaction equipment made from conventional materials can be employed.

The tetraene product can be recovered by standard procedures such as by filtering out the catalyst followed by fractional distillation to recover the diene from solvent and unreacted starting material, if any.

The invention also includes as one of its aspects the isomerization of 1,5-hexadiyne and 1,6-heptadiyne to hexa-1,5-diene-5-yne and hepta-1,3-diene-5-yne. These reactions are carried out by contacting 1,5-hexadiyne or 1,6-heptadiyne with potassium amide on alumina catalyst in accordance with the teachings hereinabove.

In the second aspect of the invention wherein a conjugated tetraene is produced, it is not necessary to isolate the di(beta-acetylene) starting reactant. Instead, the tetraene can be produced in one step by starting with a di (alpha-acetylene). The di(beta-acetylene) is produced as an intermediate, which then undergoes the isomerization to tetraene in accordance with the teachings hereinabove.

The beta-acetylenes and the compounds containing conjugated unsaturation that are produced by the several aspects of the process of this invention are, in most cases, known compounds with known utilities. They can be used as crosslinking agents in preparation of polyolefinic elastomers. They can also be used as ultra-violet light absorbers. Additional utility includes the use as intermediates in the preparation of other compounds, for example, the tetraenes can be epoxidized to produce polyepoxides useful in the preparation of surface coatings, laminates, molded articles, and the like.

The examples below illustrate the invention.

General procedure for the rearrangement and isomerization of acetylenes

The catalyst was prepared by evaporating under nitrogen a solution of potassium amide, prepared from potassium (1 g.) in liquid ammonia (25 ml.), on alumina (20 g.). The acetylenes were dissolved in a solvent (hexane, decane, benzene, etc.), and added to the fresh catalyst which was still wet with a small amount of liquid ammonia. The mixture was stirred at room temperature and the reaction was followed by I. R. spectroscopy in order to check the disappearance of the monosubstituted acetylenic group which absorbs at 3.05 and 4.7μ [reaction (a)] and by U.V. spectroscopy. The operations were performed under nitrogen. Unless otherwise stated, the catalyst was prepared as described above. All temperatures are given in centigrade.

EXAMPLE 1

Isomerization of hexa-1,5-diyne (A) Attempt at 70°.—A solution of 1,5-hexadiyne (10 g.) in hexane (10 ml.) was added to the catalyst ($KNH_2$ from potassium (1 g.) on alumina (20 g.)). The acetylenic absorption at 3.05μ (from the mono substituted acetylacetylene groups) decreased while the characteristic absorption for a vinyl group was detected at 10 and 11.0μ. No more change was observed in the I.R. spectrum within 10 to 180 minutes. The catalyst was filtered off and the compound was isolated by distillation. Yield: 60% (as measured by U.V. spectroscopy).

The isolated material contained some hexane (50%) but showed the typical I.R. spectrum of hexa-1,3-diene-5-yne. The acetylenic group absorbed at 3.05 and 4.7μ and the vinyl group absorbed strongly at 10.0 and 11.0μ. Hexa-2,5-diyne was produced first as an intermediate.

The U.V. spectrum showed an intense band at 252μ ($\epsilon_{252}$=13.700); (reported; 24.000) which shows the presence of fifty per cent diene-yne.

(B) Attempt at 25° C.—Hexa-1,3-diene-5-yne was formed in 50% yield by stirring 1.5-hexadiyne (5 g.) in hexane (100 ml.) during 2–9 hrs.

EXAMPLE 2

Isomerization of hepta-1,6-diyne

The reaction was performed at room temperature as described in the general procedure. Hepta-1,3-diene-5-yne was formed in 75% yield as shown by I.R. and U.V. spectroscopy, after first producing 2,5-heptadiyne.

EXAMPLE 3

Rearrangement of octa-1,7-diyne (A) Attempt at 70° C.—A solution of 1,7-octadiyne (20 g.) in hexane (20 g.) was added to the catalyst.

The terminal acetylenic groups were no longer detected in the I.R. spectrum after 20 minutes at 70° C. Distillation of the isomerized material gave a hydrocarbon boiling at 155–519°/750 mm. M.P. 15–16°. Yield: 60%.

One single peak was observed by G.L.C.

The I.R. and N.M.R. spectra showed that this hydrocarbon was octa-2,6-diyne.

EXAMPLE 4

Preparation of octa-1,3,5,7-tetraene from octa-1,7-diyne 1,7-octadiyne (5 g.) in hexane (100 ml.) was added to the catalyst, i.e., potassium amide on alumina prepared as described in the general procedure. Octa-2,4-diene-6-yne was formed in 50% yield after 2 hours at room temperature as shown by U.V. and I.R. spectroscopy.

1,3,5,7-octatetraene (detected by U.V. spectroscopy) was formed in 10% yield after 7–9 hours from the intermediate product 2,6-octadiyne.

EXAMPLE 5

Rearrangement of nona-1,8-diyne (A) Attempt at 70° C.—1,8-nonadiyne (24 g.) in hexane (20 ml.) was added to the catalyst prepared from potassium amide (1.5 g.) and alumina (20 g.). The mixture was heated in an oil bath at 70°. The acetylenic absorption at $3.05\mu$ disappeared after five minutes. The catalyst was filtered off and distillation in vacuo gave a liquid boiling at 70–72°/15 mm. in 84% yield. This material contained some olefinic material which was eliminated by G.L.C. The raw product contained unsaturated material which absorbed at $265\mu$ ($\epsilon=1270$) which shows the presence of conjugated diene-yne.

The purified hydrocarbon was identified as nona-2,7-diyne. (Found (percent): C, 89.6; H, 10.05; $C_9H_{12}$ required C, 89.95; H, 10.05).

The I.R. showed no terminal acetylenic absorption at 3.05 and $4.7\mu$. The methyl group absorbed at $7.25\mu$.

The N.M.R. spectrum showed the typical absorption of the methyl groups and of the $CH_2$ group in position 5 at 8.3 p.p.m. and protons of the two $CH_2$ groups adjacent to the triple bonds absorbed at 7.9 p.p.m. No ethyl group was detected.

The spectra was consistent with the structure of nona-2,7-diyne.

(B) Preparation of nona-1,3,5,7-tetraene from nona-1,8-diyne at high temperature.—1,8-nonadiyne (20 g.) in hexane (20 ml.) was added to the catalyst ($KNH_2$ (1.5 g.)) + $Al_2O_3$ (20 g.) and stirred on an oil bath at 60° during 20 minutes (until the acetylenic absorption at $3.05\mu$ disappeared). Then the stirring was stopped and the flask was taken out of the oil bath. A reaction took place in the slurry of the catalyst and the hexane refluxed spontaneously.

After cooling of the reaction mixture, the catalyst was filtered off. The solvent was evaporated and the residue was kept overnight under nitrogen at 0° C.

The yellow crystals (3 g. 15%) were collected by filtration under nitrogen and recrystallized from alcohol. The U.V. spectrum ($\epsilon=71.000$) was almost identical to the one reported in the literature for deca-2,4,6-tetraene. The U.V. spectrum of the filtrate showed that some tetraene (2 g.) remained in it so that the total yield was about 25%.

(C) Preparation of nona-1,3,5,7-tetraene at 25° C.— The reaction was performed as described in Example 4.

A small amount (10%) of tetraene was observed after 2–4 hours at room temperature. Then it disappeared progressively and only the absorption of diene-yne was observed after 6–20 hours.

(D) Preparation of nona-1,3,5,7-tetraene on a used catalyst.—After 4 days at room temperature, a new amount of 5 g. of 1,8-nonadiyne was added. The formation of nona-1,3,5,7-tetraene was observed. The maximum yield (relatively to the new amount of diyne) was 60% after 7 to 10 hours.

In order to verify if the catalyst remained active after several uses, the solution was filtered off. The residue was washed twice with hexane and a fresh solution of diyne (5% in hexane) was added to the catalyst which was then used for the third time. The tetraene was still formed. Yield: 45% after 48 hours.

The yield remained almost unchanged during another period of stirring of 70 hours.

EXAMPLE 6

Rearrangement and isomerization of deca-1,9-diyne (A) Attempt at 70° C.—The rearrangement of 1,9-decadiyne was performed as described in Example 5-A with a dilute solution of diyne (5%) in hexane. The reaction was complete within ten minutes. Deca-2,8- diyne was isolated in 95% yield but some olefinic material was present as shown by I.R. and U.V. spectroscopy. Absorption at 265 m. (=3.500) showed the presence of conjugated diene-yne (15%).

(B) Attempt at 25° C.—The rearrangement was performed at ordinary temperature with a dilute solution of 1,9-decadiyne (5 g.) in hexane (100 ml.) The reaction was complete within one hour. The catalyst was filtered off and the solvent was distilled. The residue was deca-2,8-diyne (70%) containing some olefinic material (30%). Total yield: 95%.

The I.R. and N.M.R. spectra were similar to those of nona-2,7-diyne.

(C) Preparation of 2,4,6,8-decatetraene from deca-1,9-diyne at high temperature.—1,9-decadiyne (20 g.) in hexane (20 ml.) was added to the catalyst ($KNH_2$ (1.5 g.)) on alumina (20 g.) and stirred at 70° until no more acetylenic absorption was observed at $3.05\mu$. The flask was taken out of the oil bath and a spontaneous reflux of the hexane was observed after a few minutes. The solution was filtered after cooling at room temperature, the solvent was evaporated and the residue was kept at 0° C. overnight. The yellow crystals of 2,4,6,8-decatetraene (0.7 g.) were isolated by filtration. The I.R. spectrum showed the typical absorption for olefinic C—H at $3.31\mu$, the C=C stretching was observed at $6.06\mu$, and an intense band was observed at $10.05\mu$ (C—H deformation in a conjugated trans double bond).

The U.V. spectrum was identical to the reported one. The U.V. spectrum of the filtrate showed that the overall yield in tetraene was about 15%.

(D) Preparation of 2,4,6,8-decatetraene at room temperature.—1,9-decadiyne (5 g.) in hexane (100 ml.) was added to the freshly prepared potassium amide an alumina catalyst (containing a small amount of liquid ammonia). The mixture was stirred at room temperature and the formation of the diene-yne was observed by U.V. spectroscopy (yield 2% after 2 hours).

The tetraene was formed in low yield (13%) after 6 hours.

(E) Preparation of 2,4,6,8-decatetraene on a used catalyst.—The same catalyst which was used in the preceding attempt was filtered and washed with hexane after 48 hours. A fresh solution of 1,9-decadiyne (5 g.) in hexane (100 ml.) was added and the reaction was followed by U.V. spectroscopy. The formation of tetraene in better yield (50%) than with the fresh catalyst was observed.

(F) Preparation of 2,4,6,8-decatetraene at room temperature with a dried catalyst.—1,9-decadiyne (5 g.) in hexane (100 ml.) was added to the same amount of catalyst as in the preceding attempt but which had been stirred one hour at room temperature under nitrogen so that no more liquid ammonia remained on it.

The reaction was followed by U.V. spectroscopy.

In the early stages of the reaction (time=4 hours), absorption occurred at 265μ (due to the

chromophore).

The tetraene appeared after 2 hours and its concentration reached a maximum after 4–8 hours. The total yield in tetraene was not less than 60% and it can be isolated by evaporating the solvent under nitrogen.

When the catalyst was less active, for instance when it has been in contact with air or moisture, the tetraene was not formed except by heating at 140–160° (in decane, the overall yield in tetraene was about 3.5%).

EXAMPLE 7

Rearrangement and isomerization of undeca-1,10-diyne (A) The procedures used were analogous to those described above. The acetylenic absorption at 3.05μ disappeared within five minutes at 70°. There was obtained a complex mixture of acetylenic and olefinic hydrocarbons. The main compound was undeca-2,9-diyne boiling at 32°/0.2 mm.

The I.R. spectrum was very similar to the one of nona-2,8-diyne.

(B) Preparation of 2,4,6,8-undecatetraene at 25° C.—A solution of undeca-1,10-diyne was added to the freshly prepared potassium amide on alumina catalyst at room temperature. A small amount (10%) of tetraene was observed by U.V. spectroscopy after 3 hours. The tetraene disappeared and the band of the diene-yne was observed at 265 mμ. The yield was at most 17% after 72 hours.

(C) Preparation of 2,4,6,8-undecatetraene at 25° C. on a used catalyst.—The same catalyst as in the attempt B (see above) was used in this experiment. The solution of diyne was filtered off the catalyst under nitrogen and a fresh solution was added. Some diene-ynes were observed at 265 m. The tetraene appeared rapidly and its concentration reached a maximum (50%) within 4–6 hours.

EXAMPLE 8

Isomerization of dodeca-1,11-diyne (A) Attempt at 70°.—The procedure was analogous to those described above.

The acetylenic absorption at 3.05 disappeared after twenty minutes at 70° C. One obtained a liquid boiling at 100° C./15 mm. which was a complex mixture of olefinic and acetylenic hydrocarbons. The main component of the mixture was probably dodeca-2,10-diyne as shown by the I.R. spectrum of a purified sample which was similar to the one for nona-2,7-diyne.

The U.V. spectrum of the raw material showed an intense band at 265 m. (=3.800).

(B) Preparation of 3,5,7,9-dodecatetraene from dodeca-1,11-diyne at 25° C.—Isomerization of dodeca-1,11-diyne on the freshly prepared catalyst gave a small yield of tetraene (10%) from the intermediate 2,10-dodecadiyne.

(C) Preparation of 3,5,7,9-dodecatetraene on a used catalyst.—Isomerization of dodeca-1,11-diyne on a used catalyst gave the tetraene in 30% yield after 48 hours at room temperature.

EXAMPLE 9

Isomerization of hex-1-yne.—Hex-2-yne was obtained in 70% yield after heating hex-1-yne for 10 minutes at 70° on the studied catalyst. Traces of allene were detected by I.R. spectroscopy.

The I.R. spectrum was identical to that of pure hex-2-yne.

EXAMPLE 10

Isomerization of dodeca-5,7-diyne (at 70° C.)—Dodeca-5,7-diyne (20 g.) in hexane (20 ml.) was isomerized at 70° C. as described above. The reaction was followed by U.V. spectroscopy. An intense band was observed at 265 mμ. The intensity of this band reached a maximum after 60–90 minutes ($\epsilon_{265}$=4000). The compound was isolated as previously described in 80% yield. B.P. 116°/15 mm. It was a mixture of starting material (85%) and of diene-yne (15%).

EXAMPLE 11

Isomerization of deca-4,6-diyne (at 25°).—Deca-4,6-diyne (5 g.) in hexane (100 ml.) was isomerized as previously described at 25° C. on the freshly prepared catalyst. The formation of diene-yne was observed. The maximum yield was 20% after 8 hours. Deca-2,4,6,8-tetraene was formed in 35% yield after 30 hours.

It was attempted to carry out reactions analogous to those of the process of this invention using sodium amide on alumina and barium amide on alumina as the catalysts to isomerize 1,9-decadiyne. In both cases, 2,8-decadiyne could be produced, but the further isomerization to a tetraene was not observed.

What is claimed is:

1. A process for the preparation of a hydrocarbon containing four conjugated double bonds which comprises contacting a hydrocarbon compound having two internal acetylene groups and from 8 to 20 carbon atoms with potassium amide on alumina at a temperature of from about 0° to about 160° C.

2. A process for the preparation of a hydrocarbon containing four conjugated double bonds which comprises contacting a di(beta-acetylene) hydrocarbon of from 8 to 20 carbon atoms with potassium amide on alumina at a temperature of from about 0° to about 160° C.

3. A process for the preparation of a hydrocarbon containing four conjugated double bonds which comprises contacting a member selected from the group consisting of 2,6-octadiyne, 2,7-nonadiyne, 2,8-decadiyne, 2,9-undecadiyne, 2,10-dodecadiyne and 4,6-decadiyne with potassium amide on alumina at a temperature of from about 0° to about 160° C.

4. A process which comprises contacting a member selected from the group consisting of 1,5-hexadiyne and 1,6-heptadiyne with potassium amide on alumina for a period of time and at a temperature sufficient to produce the corresponding members selected from the group consisting of hexa-1,3-diene-5-yne and hepta-1,3-diene-5-yne.

References Cited

UNITED STATES PATENTS

| 2,200,057 | 5/1940 | Carter et al. | 260—678 |
| 3,166,605 | 1/1965 | Wotiz et al. | 260—678 |
| 3,154,595 | 10/1964 | Donaldson et al. | 260—683.15 |
| 3,201,493 | 8/1965 | Meisinger et al. | 260—683.2 |
| 3,296,321 | 1/1967 | Adams et al. | 260—666 |

DELBERT E. GANTZ, Primary Examiner

G. E. SCHMITKONS, Assistant Examiner

U.S. Cl. X.R.

260—677, 683.2